(12) United States Patent
Hamaguchi et al.

(10) Patent No.: US 10,658,881 B2
(45) Date of Patent: May 19, 2020

(54) WIRELESS POWER TRANSMISSION APPARATUS AND CONTROL METHOD FOR THE SAME

(71) Applicant: ROHM CO., LTD., Ukyo-Ku, Kyoto (JP)

(72) Inventors: Sayako Hamaguchi, Kyoto (JP); Xun He, Kyoto (JP); Naoki Inoue, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 164 days.

(21) Appl. No.: 15/806,790

(22) Filed: Nov. 8, 2017

(65) Prior Publication Data

US 2018/0131243 A1    May 10, 2018

(30) Foreign Application Priority Data

Nov. 8, 2016 (JP) ................................ 2016-218233

(51) Int. Cl.
*H02J 50/80* (2016.01)
*H02J 50/12* (2016.01)
*H02M 7/5387* (2007.01)

(52) U.S. Cl.
CPC .............. *H02J 50/80* (2016.02); *H02J 50/12* (2016.02); *H02M 7/5387* (2013.01)

(58) Field of Classification Search
CPC . H02J 50/00; H02J 50/12; H02J 50/80; H04B 5/00
USPC ......................................................... 307/104
See application file for complete search history.

(56) References Cited

U.S. PATENT DOCUMENTS

| | | | | |
|---|---|---|---|---|
| 9,787,364 | B2* | 10/2017 | Moore | H04B 5/0031 |
| 2008/0211320 | A1* | 9/2008 | Cook | H01Q 7/005 |
| | | | | 307/149 |
| 2015/0341087 | A1* | 11/2015 | Moore | H04B 5/0031 |
| | | | | 455/77 |
| 2016/0190818 | A1* | 6/2016 | He | H02J 50/10 |
| | | | | 307/104 |
| 2016/0352155 | A1* | 12/2016 | Iwasaki | H02J 7/025 |
| 2018/0034506 | A1* | 2/2018 | Moore | H02J 50/40 |
| 2018/0309328 | A1* | 10/2018 | Hwang | H02J 50/12 |

FOREIGN PATENT DOCUMENTS

JP     2016025849 A     2/2016

* cited by examiner

*Primary Examiner* — Adi Amrany
(74) *Attorney, Agent, or Firm* — Cantor Colburn LLP

(57) ABSTRACT

First, a power receiving apparatus RX is detected (S100). Subsequently, a pre digital ping is sent according to a first method (S112). Upon reception of an unique signal defined for the first method from the power receiving apparatus RX (YES in S114), tentative judgment is made that the power receiving apparatus RX supports the first method, and the flow transits to a final judgment operation (S120). When such an unique signal has not been received (NO in S114), tentative judgment is made that the power receiving apparatus RX supports a second method, and the flow transits to a final judgment operation (S130).

22 Claims, 7 Drawing Sheets

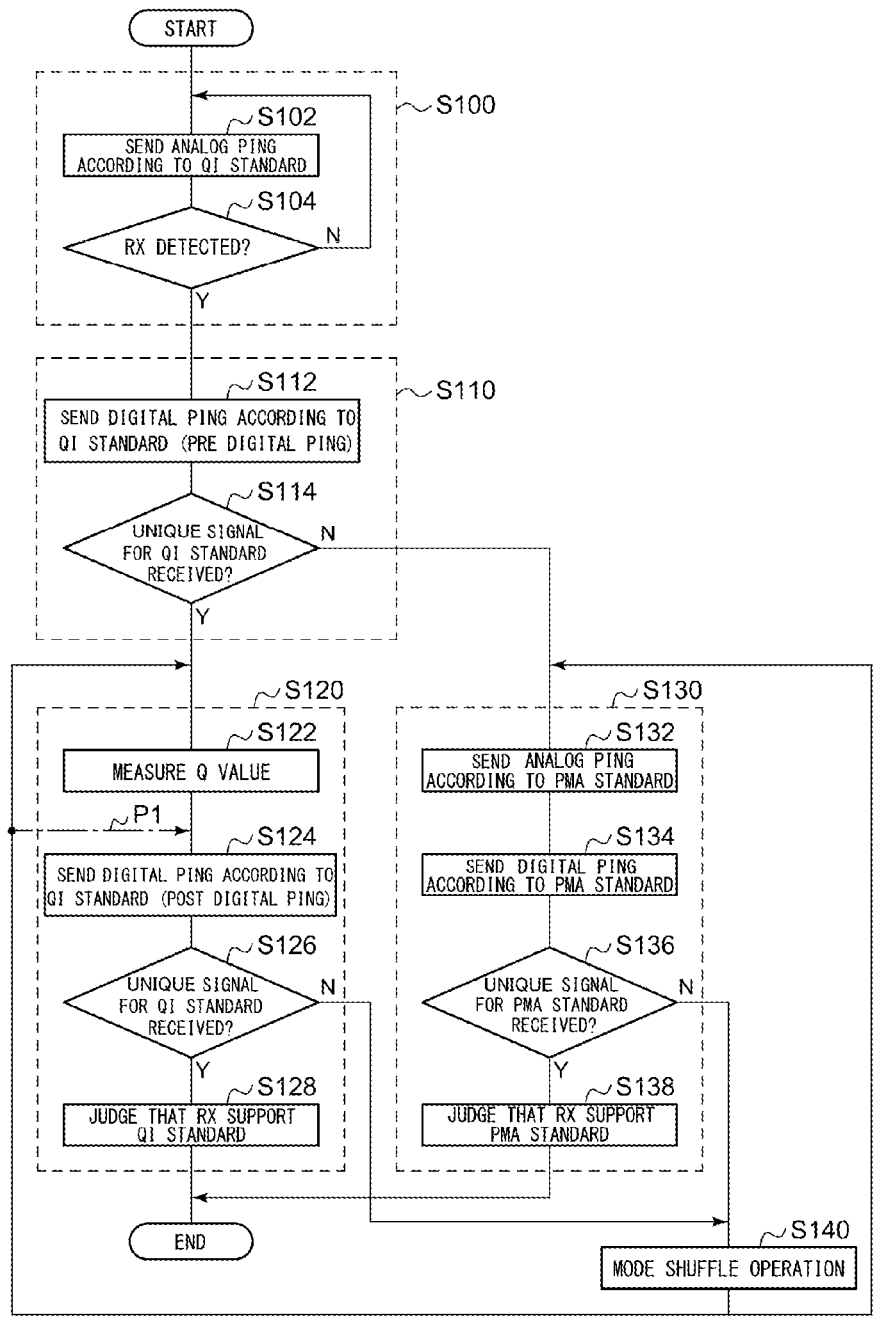

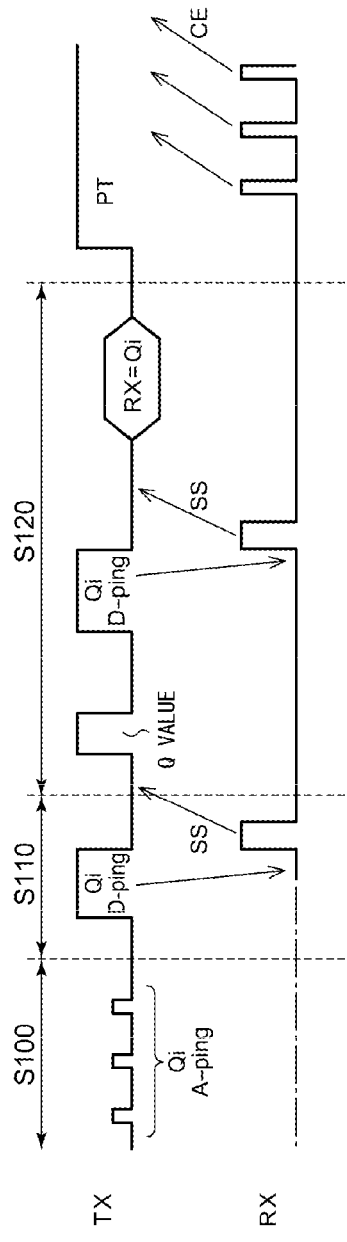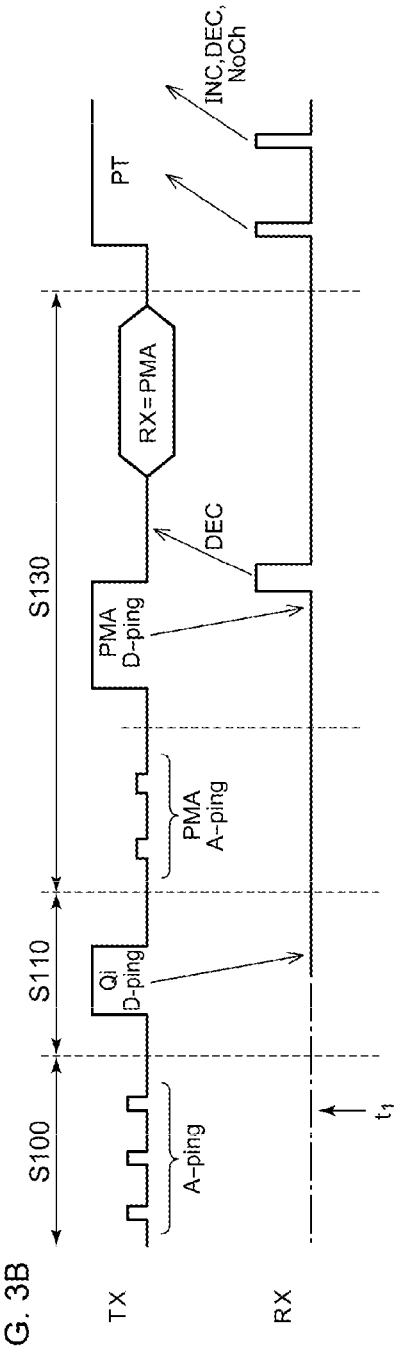
FIG. 3A
FIG. 3B

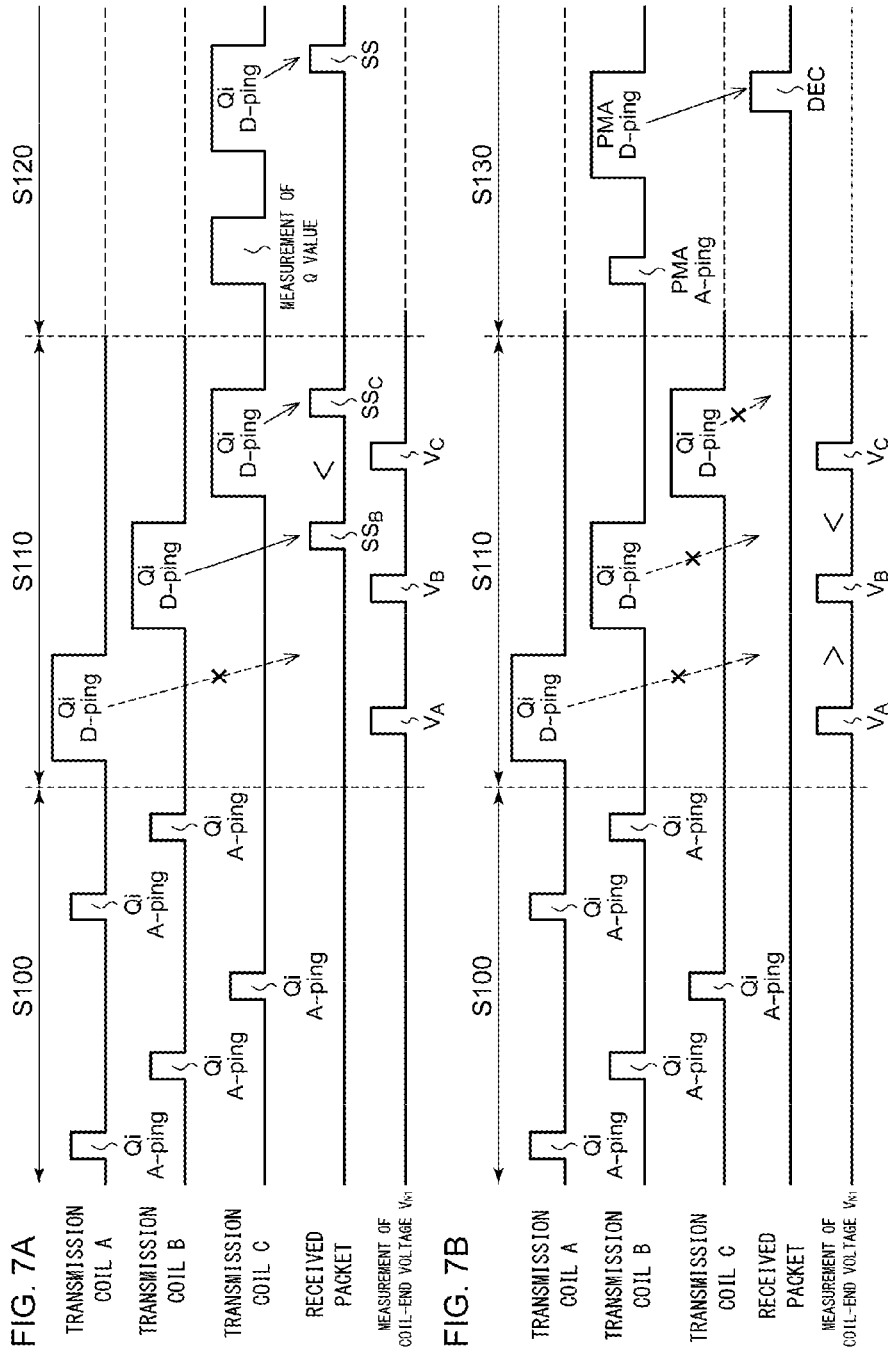

WIRELESS POWER TRANSMISSION APPARATUS AND CONTROL METHOD FOR THE SAME

CROSS-REFERENCE TO RELATED APPLICATIONS

The present invention claims priority to Japanese patent application No. 2016-218233, filed on Nov. 8, 2016, the entire disclosure of which is incorporated herein by reference.

BACKGROUND OF THE INVENTION

1. Field of the Invention

The present invention relates to a wireless power supply technique.

2. Description of the Related Art

In recent years, in order to supply electric power to an electronic device, contactless power transmission (which is also referred to as "contactless power supply" or "wireless power supply") has begun to come into commonplace use. In order to advance the compatibility of products between manufacturers, the WPC (Wireless Power Consortium) has been organized, and the WPC has developed the Qi standard as an international standard.

FIG. 1 is a diagram showing a configuration of a wireless power supply system 100 that supports the Qi standard. The power supply system 100 includes a power transmission apparatus 200 (TX: power transmitter) and a power receiving apparatus 300 (RX: power receiver). The power receiving apparatus 300 is mounted on an electronic device, examples of which include cellular phone terminals, smartphones, audio players, game machines, and tablet terminals.

The power transmission apparatus 200 includes a transmission antenna 201, an inverter 204, a controller 206, and a demodulator 208. The transmission antenna 201 includes a transmission coil (primary coil) 202 and a resonance capacitor 203. The inverter 204 includes an H-bridge circuit (full-bridge circuit) or otherwise a half-bridge circuit. The inverter 204 applies a driving signal S1, specifically, in the form of a pulse signal, to the transmission coil 202. This provides a driving current flowing through the transmission coil 202, which generates an electric power signal S2 at the transmission coil 202 in the form of an electromagnetic signal. The controller 206 integrally controls the overall operation of the power transmission apparatus 200. Specifically, the controller 206 controls the switching frequency of the inverter 204, the duty ratio or the phase of the switching, or otherwise the voltage $V_{DC}$ supplied to the inverter, so as to adjust the electric power to be transmitted. The controller 206 may be configured by means of a hardware component such as a logic circuit, FPGA (Field Programmable Gate Array), or the like. Also, the controller 206 may be configured in the form of a combination of a microcomputer or a CPU (Central Processing Unit) and a software program.

In the Qi standard, a protocol is defined for communication between the power transmission apparatus 200 and the power receiving apparatus 300, which enables control data S3 to be transmitted from the power receiving apparatus 300 to the power transmission apparatus 200. The control data S3 is transmitted from a reception coil 302 (secondary coil) to the transmission coil 202 in the form of an AM (Amplitude Modulation) modulated signal using backscatter modulation. The control data S3 includes electric power control data (which will also be referred to as a "packet") which indicates an amount of electric power to be supplied to the power receiving apparatus 300, and data which indicates the particular information for identifying the power receiving apparatus 300. The demodulator 208 demodulates the control data S3 included in the current or otherwise the voltage applied to the transmission coil 202. The controller 206 controls the inverter 204 based on the power control data included in the control data S3 thus demodulated.

The power receiving apparatus 300 includes the reception coil 302, a rectifier circuit 304, a smoothing capacitor 306, a power supply circuit 308, a modulator 310, a demodulator 312, and a controller 314. The reception coil 302 receives the electric power signal S2 from the transmission coil 202, and transmits the control data S3 to the transmission coil 202. The rectifier circuit 304 and the smoothing capacitor 306 rectify and smooth a current S4 induced at the reception coil 302 according to the electric power signal S2, thereby converting the current S4 into a DC voltage $V_{RECT}$. The power supply circuit 308 stabilizes the DC voltage $V_{RECT}$, so as to generate an output voltage $V_{OUT}$. The output voltage $V_{OUT}$ is supplied to an unshown load circuit.

The controller 314 is configured as a microcomputer or a CPU, for example. The controller 314 executes a software program so as to support the power supply that conforms to the Qi standard. For example, the controller 314 monitors the amount of electric power received by the power receiving apparatus 300. The controller 314 generates power control data (a control error value) that indicates electric power to be supplied, based on the monitored value. The modulator 310 changes the parallel resonant frequency of the reception antenna 301 based on the control data S3 including the power control data, so as to change the coil current and the coil voltage applied to the transmission coil 202, thereby providing information transmission.

The Qi standard allows control data S5 to be transmitted from the power transmission apparatus 200 to the power receiving apparatus 300. The control data S5 is superimposed on the electric power signal S2 using the FSK (Frequency Shift Keying) method, and transmitted from the transmission coil 202 to the reception coil 302. The control data S5 may include an acknowledgement (ACK) signal, a negative acknowledgement (NAK) signal, etc.

An FSK modulator 220 is built into the controller 206. The FSK modulator 220 changes the switching frequency of the inverter 204 according to the data to be transmitted. The demodulator 312 arranged on the power receiving apparatus 300 side demodulates the FSK-modulated control data (which will also be referred to as an "FSK signal") S5. The above is the configuration of the power supply system 100.

In recent years, the standard developed by the PMA (Power Matters Alliance) (now the standardizing body "Air-Fuel Alliance", which has been organized as an integration of the PWA and the A4WP) has also begun to come into commonplace use. As a result of investigating a power transmission apparatus 200 that supports both the power receiving apparatus 300 that conforms to the Qi standard and the power receiving apparatus 300 that conforms to the PMA standard, the present inventor has come to recognize the following problem.

The Qi standard and the PMA standard employ different start-up sequences for starting up the power supply system 100. Accordingly, after the power transmission apparatus 200 detects the power receiving apparatus 300, the power transmission apparatus 200 is required to judge the standard (method) employed in the power receiving apparatus 300.

SUMMARY OF THE INVENTION

The present invention has been made in order to solve such a problem. Accordingly, it is an exemplary purpose of an embodiment of the present invention to provide a power transmission apparatus that is capable of determining a power supply method for supplying electric power to a power receiving apparatus and a control method employed in the power transmission apparatus.

An embodiment of the present invention relates to a control method for a wireless power transmission apparatus structured to be capable of supplying electric power to a wireless power receiving apparatus that supports at least a first method or otherwise a second method. The control method comprises: a step A in which the wireless power receiving apparatus is detected; a step B in which, when the wireless power receiving apparatus has been detected, a digital ping designed for the first method (which will be referred to as the "pre digital ping" in the present specification) is sent, and when the wireless power transmission apparatus has received an unique signal defined for the first method from the wireless power receiving apparatus as a result of the pre digital ping of the first method, tentative judgment is made that the wireless power receiving apparatus supports the first method, and when the wireless power transmission apparatus has not received such an unique signal, tentative judgment is made that the wireless power receiving apparatus supports the second method; a step C in which, when tentative judgment has been made that the wireless power receiving apparatus supports the first method, final judgment is made regarding whether or not the wireless power receiving apparatus supports the first method; and a step D in which, when tentative judgment has been made that the wireless power receiving apparatus supports the second method, final judgment is made regarding whether or not the wireless power receiving apparatus supports the second method.

With such an embodiment, this allows the time required to determine the power supply method (standard) for the power receiving apparatus to be reduced.

Also, in the step C, a digital ping of the first method (which will be referred to as the "post digital ping" in the present specification) may be sent. Also, upon reception of an unique signal defined for the first method from the wireless power receiving apparatus as a result of the post digital ping of the first method, final judgment may be made that the wireless power receiving apparatus supports the first method. Also, in the step D, an analog ping and a digital ping may be sent according to the second method. Also, upon reception of an unique signal defined for the second method from the wireless power receiving apparatus as a result of the digital ping of the second method, final judgment may be made that the wireless power receiving apparatus supports the second method.

Also, when neither final judgment that the wireless power receiving apparatus supports the first method nor final judgment that the wireless power receiving apparatus supports the second method has been made, the aforementioned steps C and D may be repeated in a predetermined sequence.

By optimizing the predetermined sequence, this allows the judgment time to be optimized.

Also, the aforementioned sequence may by designed such that it differs from an alternating sequence in which the aforementioned steps C and D are alternately repeated.

This is capable of preventing the power transmission apparatus and the power receiving apparatus from operating in mismatched operation modes that are mutually exchanged for every operation.

Also, the ratio between the number of times the aforementioned step C is performed and the number of times the aforementioned step D is performed may correspond to a magnitude relation between the number of wireless power receiving apparatuses that support the first method and the number of wireless power receiving apparatuses that support the second method.

The number of wireless power receiving apparatuses represents the number of wireless power receiving apparatuses actually used in a field, the number of wireless power receiving apparatuses on the market, or the like. That is to say, the number of wireless power receiving apparatuses is associated with the probability of their existence. By raising the number of times the operation from among the operations C and D that corresponds to a higher probability of existence is performed, this allows the judgment time for judging the method supported by the power receiving apparatus to be statistically reduced.

Also, the wireless power transmission apparatus may comprise multiple transmission coils. Also, in the aforementioned step B, the following sequence may be repeatedly executed while sequentially selecting one from among the multiple transmission coils. The sequence may comprise: B-1) sending a digital ping of the first method, B-2) acquiring an electrical state of the selected transmission coil, and B-3) judging whether or not an unique signal defined for the first method has been received. Also, when an unique signal defined for the first method has been received as a result of the digital ping of the first method, the transmission coil to be used in the subsequent operations may be determined based on results of comparison of the unique signals received for the respective transmission coils.

With such an arrangement, the subsequent operations C and D do not require the transmission coil switching operation. This allows the time required for the start-up operation and the time required to determine the power supply method for supplying power to the power receiving apparatus RX to be reduced.

Furthermore, such an arrangement is capable of selecting an optimum transmission coil using a digital ping of the first method without involving a digital ping of the second method.

The unique signal may be configured as an SS (Signal Strength) packet defined in the Qi standard. This is capable of selecting a transmission coil that exhibits the highest degree of coupling with the power receiving apparatus.

Also, when an unique signal defined for the first method has not been received as a result of the digital ping of the first method, the transmission coil to be used in the subsequent operations may be determined based on results of comparison of the electrical states acquired for the multiple respective transmission coils.

Also, the electrical state may be a voltage at a connection node that couples the transmission coils and a series resonance capacitor. As the degree of coupling between the transmission coil and the reception coil becomes higher, the voltage at the connection node becomes lower. Accordingly, by selecting the reception coil for which the voltage at the connection node is the minimum, such an arrangement is capable of supplying electric power to the power receiving apparatus RX with the highest efficiency.

Also, the first method may correspond to the Qi standard. Also, the second method may correspond to the PMA standard.

When tentative judgment has been made that the wireless power receiving apparatus supports the first method, the Q value of the transmission antenna may be measured before sending a post digital ping of the first method.

Also, in a case in which the aforementioned step C is repeated multiple times, the Q value measurement may be omitted in a second and subsequent executions of the step C. The Q value measurement requires a long period of time. Accordingly, by omitting redundant measurement, this allows the start-up time to be reduced.

Another embodiment of the present invention relates to a wireless power transmission apparatus structured to be capable of supplying an electric power signal to a wireless power receiving apparatus that supports at least a first method or otherwise a second method. The wireless power transmission apparatus comprises: a transmission antenna; an inverter arranged such that an output side thereof is coupled to the transmission antenna; and a controller structured to control the inverter. The controller is structured to execute: a step in which the wireless power receiving apparatus is detected; a step in which, when the wireless power receiving apparatus has been detected, a pre digital ping is sent according to the first method, and when the wireless power transmission apparatus has received an unique signal defined for the first method from the wireless power receiving apparatus as a result of the pre digital ping of the first method, tentative judgment is made that the wireless power receiving apparatus supports the first method, and when the wireless power transmission apparatus has not received such an unique signal, tentative judgment is made that the wireless power receiving apparatus supports the second method; a step in which, when tentative judgment has been made that the wireless power receiving apparatus supports the first method, a post digital ping is sent according to the first method, and when an unique signal defined for the first method has been received from the wireless power receiving apparatus as a result of the post digital ping of the first method, final judgment is made that the wireless power receiving apparatus supports the first method; and a step in which, when tentative judgment has been made that the wireless power receiving apparatus supports the second method, an analog ping and a digital ping are sent according to the second method, and when an unique signal defined for the second method has been received from the wireless power receiving apparatus as a result of the digital ping of the second method, final judgment is made that the wireless power receiving apparatus supports the second method.

It is to be noted that any arbitrary combination or rearrangement of the above-described structural components and so forth is effective as and encompassed by the present embodiments. Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 2 is a flowchart showing a control method for a power transmission apparatus according to a first embodiment;

FIGS. 3A and 3B are time charts each showing the start-up operations of a power transmission apparatus TX and a power receiving apparatus RX according to the flowchart shown in FIG. 2;

FIGS. 7A and 7B are time charts each showing the start-up operations of the power transmission apparatus TX and the power receiving apparatus RX according to the flowchart shown in FIG. 6.

DETAILED DESCRIPTION OF THE INVENTION

Figure 1:
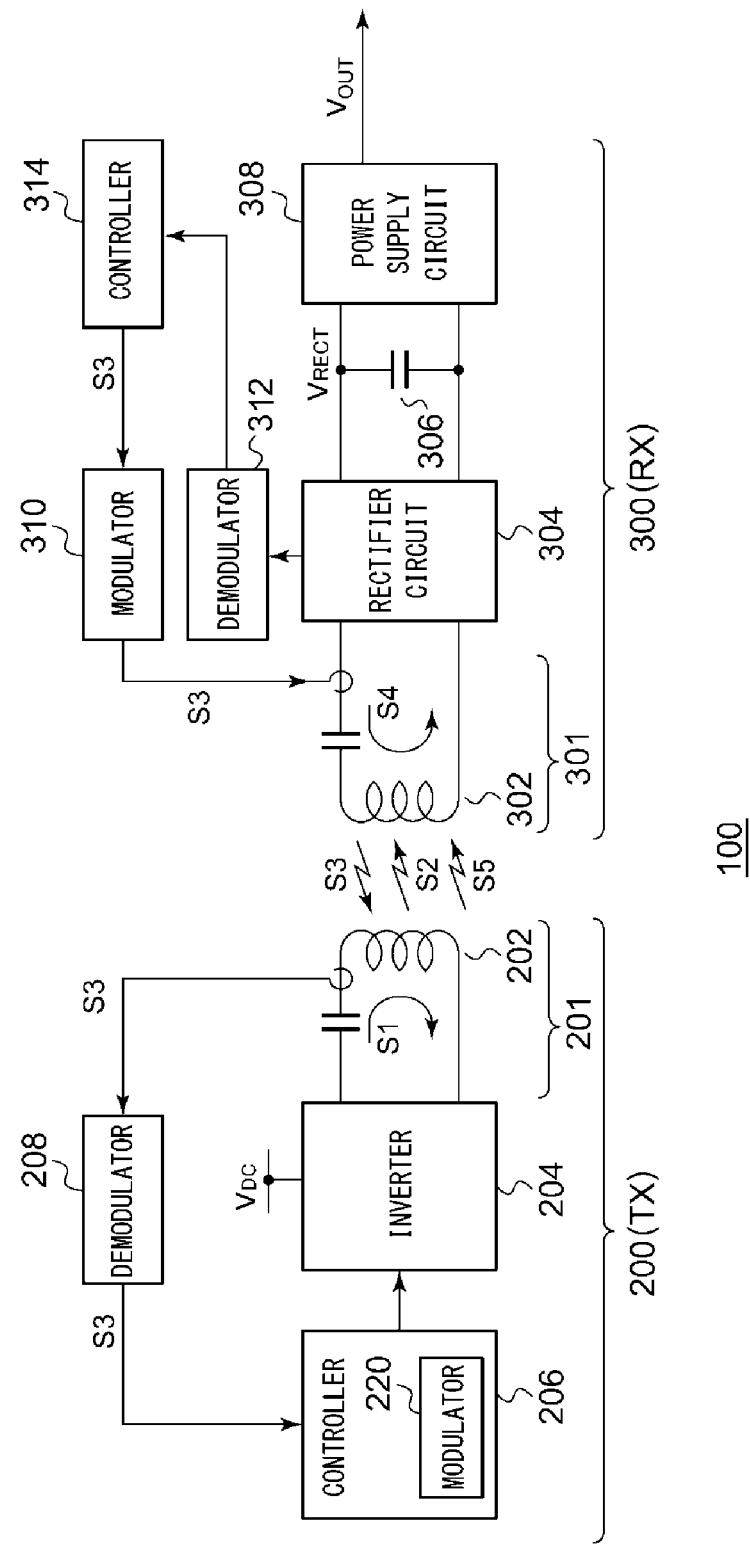
FIG. 1 is a diagram showing a configuration of a wireless power supply system that supports the Qi standard.

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is coupled to the member B" includes a state in which the member A is indirectly coupled to the member B via another member that does not substantially affect the electric connection between them, or that does not damage the functions or effects of the connection between them, in addition to a state in which they are physically and directly coupled.

Similarly, the state represented by the phrase "the member C is provided between the member A and the member B" includes a state in which the member A is indirectly coupled to the member C, or the member B is indirectly coupled to the member C via another member that does not substantially affect the electric connection between them, or that does not damage the functions or effects of the connection between them, in addition to a state in which they are directly coupled.

First Embodiment

A power transmission apparatus TX and a power receiving apparatus RX have the same basic configurations as those described with reference to FIG. 1. The power transmission apparatus TX corresponds to the power transmission apparatus 200 shown in FIG. 1. The power receiving apparatus RX corresponds to the power receiving apparatus 300 shown in FIG. 1. The power receiving apparatus RX supports one or both of a first method and a second method. In the present embodiment, the first method corresponds to the Qi standard, and the second method corresponds to the PMA standard. However, the present invention is not restricted to such an arrangement. Also, the difference between the first method and the second method may be a difference in version (generation) of the same standard.

The power transmission apparatus TX judges whether the power receiving apparatus RX placed on a charging stand of the power transmission apparatus TX supports the Qi standard (first method) or the PMA standard (second method).

The power transmission apparatus TX performs power supply according to a protocol defined in the standard thus judged.

FIG. 2 is a flowchart showing a control method employed in the power transmission apparatus according to a first embodiment. The operation of the power transmission apparatus can be roughly classified into the following operations.

(i) S100 for detecting the power receiving apparatus RX.

(ii) S110 for tentative judgment (provisional determination) of whether the power receiving apparatus RX supports the Qi standard or the PMA standard.

(iii) S120 for final judgment (non-provisional determination) of whether or not the power receiving apparatus RX supports the Qi standard.

(iv) S130 for final judgment (non-provisional determination) of whether or not the power receiving apparatus RX supports the PMA standard.

(v) S140 for supporting a case in which the flow has not passed the final judgment.

In a case in which the controller 206 shown in FIG. 1 is configured as a logic circuit or an FPGA, the controller 206 may be provided with a sequencer or otherwise a state machine in the form of a hardware component that is capable of executing the flowchart shown in FIG. 2. On the other hand, in a case in which the controller 206 is configured as a CPU or a microcomputer, a program (firmware) may be prepared in order to execute the flowchart shown in FIG. 2, and the controller 206 may be configured to execute the program.

First, the detection operation S100 is performed. In the detection operation S100, an analog ping is sent according to the Qi standard (S102). More specifically, weak electric power is transmitted via a transmission antenna with a magnitude that does not involve the startup (wakeup) of the power receiving apparatus RX. The presence or absence of resonance shift is monitored.

Subsequently, the presence or absence of the power receiving apparatus 300 (RX) is judged based on the resonance shift (S104). When the power receiving apparatus RX has not been detected (NO in S104), an analog ping is sent again with a predetermined interval (S102). When the power receiving apparatus RX has been detected (YES in S104), the flow proceeds to the tentative judgment operation S110.

In the tentative judgment operation S110, tentative judgment is made regarding whether the detected power receiving apparatus RX supports the Qi standard or the PMA standard. Specifically, a digital ping (which will be referred to as the "pre digital ping") is sent according to the Qi standard (S112). Furthermore, judgment is made regarding whether or not an unique signal to be expected in the case of the Qi standard has returned from the power receiving apparatus RX (S114). Upon reception of the unique signal defined for the Qi standard (YES in S114), the transmission apparatus TX makes tentative judgement that the power receiving apparatus RX supports the Qi standard. In this case, the flow proceeds to the final judgment operation for the Qi standard, i.e., S120. Conversely, when the power transmission apparatus TX has not received such an unique signal defined for the Qi standard (NO in S114), the power transmission apparatus TX makes tentative judgment that the power receiving apparatus RX supports the PMA standard. In this case, the flow proceeds to the final judgment operation for the PMA standard, i.e., S130.

In the final judgment operation for the Qi standard, i.e., S120, first the Q value is measured (S122). Before the transition to the power transfer phase, foreign object detection (FOD) is performed based on the Q value thus measured. Specifically, in the negotiation phase preceding the power transfer phase, the power transmission apparatus TX receives an FOD status packet from the power receiving apparatus RX, and compares the Q value information included in this packet with the Q value measured in Step S122, so as to perform the foreign object detection. As a subsequent operation of the Q value measurement, a digital ping of the Qi standard (which will be referred to as the "post digital ping" as compared with the pre digital ping sent in S112) is sent (S124). As a result of the post digital ping in S124, judgment is made regarding whether or not an unique signal to be expected in a case of the Qi standard has returned from the power receiving apparatus RX (S126). Upon reception of an SS packet (YES in S126), the power transmission apparatus TX makes final judgment that the power receiving apparatus RX supports the Qi standard (S128), and ends the operation. Conversely, when the power transmission apparatus TX has not received such an unique signal defined for the Qi standard (NO in S126), the operation transits to S140 for supporting a case in which the flow has not passed the final judgment.

In the final judgment operation S130 for the PMA standard, an analog ping is sent according to the PMA standard (S132), following which a digital ping is sent according to the PMA standard (S134). As a result of the digital ping in S134, judgement is made regarding whether or not an unique signal to be expected in a case of the PMA standard (e.g., a DEC (decrement) signal that is an instruction to increase the electric power to be transmitted) has returned from the power receiving apparatus RX (S136). Instead of the DEC signal, an INC signal that is an instruction to lower the electric power to be transmitted, or a NoCh signal that is an instruction to maintain the electric power to be transmitted, may be employed. Upon reception of such a DEC signal or the like (YES in S136), the power transmission apparatus TX makes final judgment that the power receiving apparatus RX supports the PMA standard (S138), and ends the operation. Conversely, when the power transmission apparatus TX has not received such an unique signal defined for the PMA standard (NO in S136), the operation transits to S140 for supporting a case in which the flow has not passed the final judgment.

When the flow has not passed the final judgment for the power receiving apparatus RX in the operation S120 or S130, the flow transits to the operation (mode shuffle operation) S140 in which the flow returns to any one from among the final judgment operation for the Qi standard and the final judgment operation for the PMA standard.

Let us consider a case in which the power receiving apparatus RX supports both the Qi standard and the PMA standard. Furthermore, let us consider a case in which the power receiving apparatus RX alternately switches its receiving mode between the Qi standard receiving mode and the PMA standard receiving mode. In this case, in a case in which the Qi standard final judgment operation S120 and the PMA standard final judgment operation S130 are alternately repeated in the operation S140, in some cases, this leads to a problem of the occurrence of a loop in which the power transmission apparatus TX and the power receiving apparatus RX operate in mismatched operation modes according to different standards, i.e., the Qi standard and the PMA standard, that are mutually exchanged for every operation in Step S140.

In order to solve such a problem, the mode shuffle operation S140 is performed so as to repeatedly perform the Qi standard final judgment operation S120 and the PMA standard final judgment operation in a predetermined sequence that differs from an alternating sequence. For example, a sequence in which the final judgment operation is performed three times in the order of the Qi standard mode, the Qi standard mode, and the PMA standard mode, may be defined as an operation cycle, and the operation cycle thus defined may be repeatedly performed. Also, a sequence in which the final judgment operation is performed four times in the order of the Qi standard mode, the Qi standard mode, the Qi standard mode, and the PMA standard mode, may be defined as an operation cycle, and the operation cycle thus defined may be repeatedly performed. Also, the operation cycle to be repeatedly performed may be configured as a sequence in which the final judgment operation is performed four times in the order of the Qi standard mode, the Qi standard mode, the PMA standard mode, and Qi standard mode. The length and the order of such an operation cycle is not restricted in particular.

With such an arrangement, in such a single cycle operation, the number of times the Qi standard final judgment is performed, i.e., X, and the number of times the PMA standard final judgment is performed, i.e., Y, and in other words, the ratio between the number of times the Qi standard final judgment is to be performed and the number of times the PMA standard final judgment is to be performed, is preferably designed according to the popularization ratio between the Qi standard and the PMA standard, i.e., according to the number of Qi standard devices and the number of PMA standard devices on the market. At present, Qi standard power receiving apparatuses RX are popular as compared with PMA standard power receiving apparatuses. Accordingly, the operation cycle is preferably designed such that X>Y holds true. By designing such an operation cycle giving consideration to the popularization ratio, this allows the time (statistical expected value) required for the final judgment of the standard employed in the power receiving apparatus RX to be reduced.

The above is the operation of the power transmission apparatus TX. Next, description will be made regarding the execution of the operation. FIGS. 3A and 3B are time charts showing the start-up operations of the power transmission apparatus TX and the power receiving apparatus RX.

FIG. 3A shows an operation in which the power receiving apparatus RX is designed assuming a power supply sequence that conforms to the Qi standard.
[Operation S100]

The transmission apparatus TX sends an analog ping according to the Qi standard. When the power receiving apparatus RX is placed on a charging stand at the time point ti, the power transmission apparatus TX detects the power receiving apparatus RX (S100).
[Operation S110]

Next, the power transmission apparatus TX sends a digital ping according to the Qi standard. In response to the digital pin, the power receiving apparatus RX returns an SS packet. Upon reception of the SS packet, the power transmission apparatus TX makes tentative judgment that the power receiving apparatus RX supports the Qi standard.
[Operation S120]

Upon reception of the SS packet, the power transmission apparatus TX measures the Q value. The measurement of the Q value requires a relatively long period of time. Accordingly, the power receiving apparatus RX has the potential to temporarily return to the sleep state from the wakeup state. Accordingly, in order to set the power receiving apparatus RX to the wakeup state again, the power transmission apparatus TX sends a digital ping according to the Qi standard. In response to the digital ping, the power receiving apparatus RX returns an SS packet. Upon reception of the SS packet, the power transmission apparatus TX makes a final judgment that the power receiving apparatus RX supports the Qi standard.

Subsequently, the operation transits to the power transfer phase PT via the identification/configuration phase, negotiation phase, and calibration phase. In the power transfer phase, the power receiving apparatus RX transmits, to the power transmission apparatus TX, a CE (Control Error) packet that indicates electric power to be transmitted. The power transmission apparatus TX feedback controls the electric power to be transmitted, by means of a PID (Proportional-Integral-Differential) control operation, a PI (Proportional-Integral) control operation, or the like, according to the CE packet.

FIG. 3B shows an operation in which the power receiving apparatus RX is designed assuming a power supply sequence that conforms to the PMA standard.
[Operation S100]

The transmission apparatus TX sends an analog ping according to the Qi standard. When the power receiving apparatus RX is placed on a charging stand at the time point ti, the power transmission apparatus TX detects the power receiving apparatus RX (S100). It should be noted that, in a case in which the power receiving apparatus RX supports the PMA standard instead of the Qi standard, resonance shift also occurs. Accordingly, by sending such an analog ping according to the Qi standard, such an arrangement is capable of detecting the power receiving apparatus RX even if it supports the PMA standard.
[Operation S110]

Next, the power transmission apparatus TX sends a digital ping according to the Qi standard. The power receiving apparatus RX does not support the Qi standard. Accordingly, the power receiving apparatus RX does not return an SS packet. In this case, the power transmission apparatus TX makes a tentative judgment that the power receiving apparatus RX supports the PMA standard, following which the flow transits to the operation S130.
[Operation S130]

The power transmission apparatus sends a digital ping according to the PMA standard. In response to the digital ping, the power receiving apparatus RX returns a DEC signal. Upon reception of the DEC signal, the power transmission apparatus TX makes a final judgment that the power receiving apparatus RX supports the PMA standard.

Subsequently, the operation phase transits to the power transfer phase PT via the identification phase. In the power transfer phase, the power receiving apparatus RX transmits the DEC signal, the INC signal, and the NoCh signal, each of which is an instruction for electric power transmission, to the power transmission apparatus TX. The power transmission apparatus TX raises, lowers, or otherwise maintains the electric power to be transmitted, based on the DEC signal, INC signal, and NoCh signal.

The above are the operations of the power transmission apparatus TX and the power receiving apparatus RX. Next, description will be made regarding advantages of the power transmission apparatus TX.
[First Advantage]

The first advantage of the control flow shown in FIG. 2 can be clearly understood in comparison with a comparison technique described below.

Figure 4:
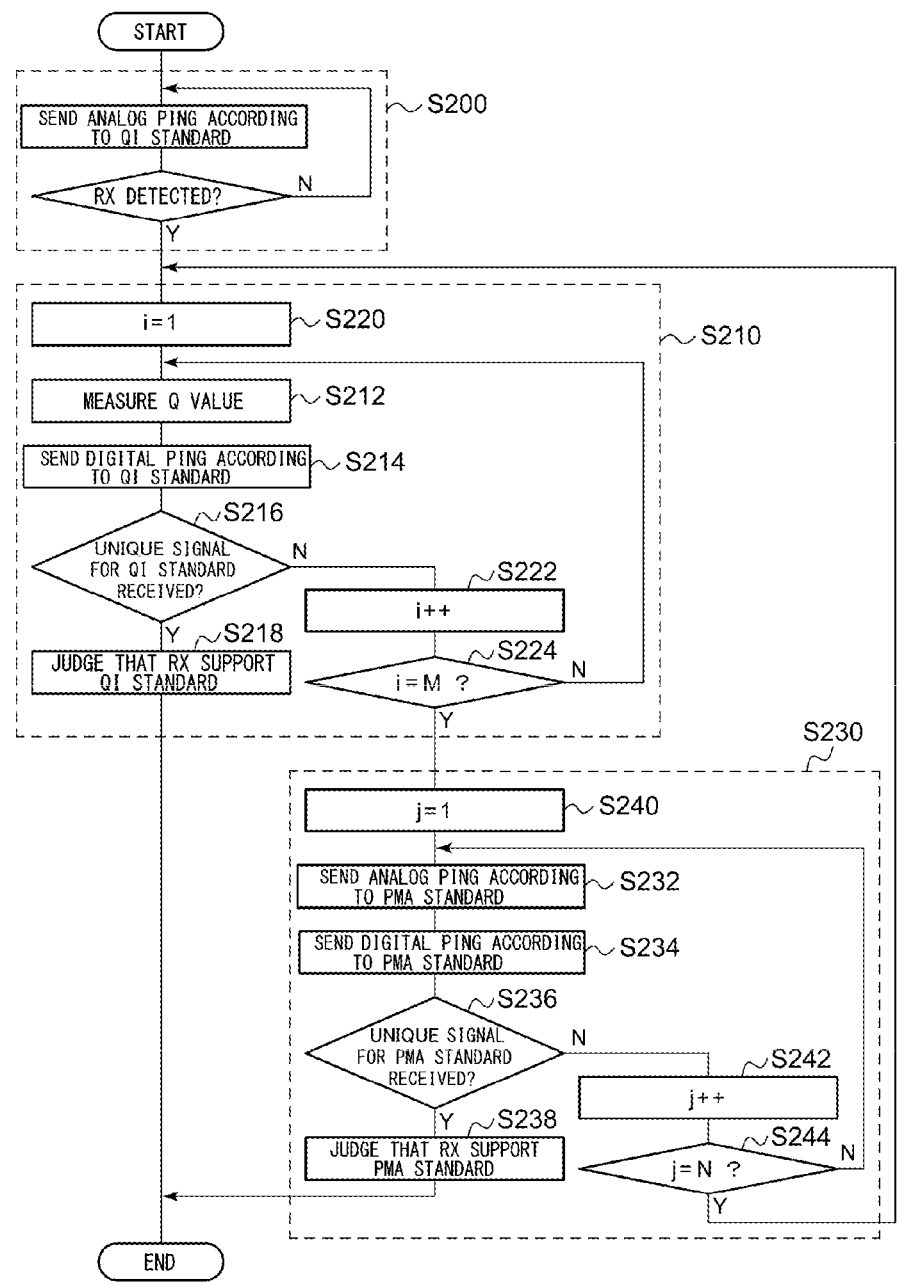
FIG. 4 is a flowchart showing a control method for a power transmission apparatus according to a comparison technique.

FIG. 4 is a flowchart showing a control method for a power transmission apparatus according to a comparison technique. The operation of the power transmission apparatus TX according to the comparison technique can be roughly classified into the following operations.

(i) S200 for detecting the power receiving apparatus RX.

(ii) S210 for final judgment (non-provisional determination) of whether or not the power receiving apparatus RX supports the Qi standard.

(iii) S230 for final judgment (non-provisional determination) of whether or not the power receiving apparatus RX supports the PMA standard.

That is to say, first, judgment is made regarding the presence or absence of the power receiving apparatus RX. When the power receiving apparatus RX has been detected, Qi standard judgment is repeatedly performed M times (M≥1). When judgment has been made that the power receiving apparatus RX does not support the Qi standard, the PMA standard judgment is repeatedly performed N times (N≥1).

The operation S200 for detecting the power receiving apparatus RX is the same as the detection operation S100 shown in FIG. 2.

Subsequently, in the Qi standard final judgment operation S210, first, the variable i is initialized (S220). The variable i is incremented every time the loop operation is repeatedly performed (S222). Judgment is made regarding whether or not the variable i reaches a predetermined number M (S224). In the single loop operation, the Q value measurement operation S212 is performed, a digital ping is sent according to the Qi standard (S214), and when an unique signal defined for the Qi standard is received, i.e., upon reception of a response from the power receiving apparatus (YES in S216), judgment is made that the power receiving apparatus RX supports the Qi standard (S218), and the operation ends. When such an unique signal defined for the Qi standard has not been received even after the digital ping has been sent M times (NO in S216), the flow transits to the PMA standard final judgment operation S230. In a case in which M=1, the repetition of the loop operation is omitted.

In the final judgment operation S230 for the PMA standard, first, the variable i is initialized (S240). The variable i is incremented every time the loop operation is repeatedly performed (S242). Judgment is made regarding whether or not the variable i reaches a predetermined number N (S244). In the single loop operation, an analog ping of the PMA standard and a digital ping of the PMA standard are sent (S232, S234), and when an unique signal defined for the PMA standard is received (YES in S236), judgment is made that the power receiving apparatus RX supports the PMA standard (S238), and the operation ends. When such an unique signal defined for the PMA standard has not been received even after the digital ping has been sent N times (NO in S236), the flow returns to the Qi standard judgment operation S210. In a case in which N=1, the repetition of the loop operation is omitted.

The above are the operations according to a comparison technique. The operations shown in FIG. 2 have the following advantages as compared with this comparison technique.

Let us consider a case in which the power receiving apparatus RX that supports the PMA standard is placed on a charging stand. In this case, with such a comparison technique, the flow transits to the operation S230 for the PMA standard judgment after the Qi standard judgement operation S210 has been performed M times. Accordingly, the time required to identify the power receiving apparatus RX is longer than ($\tau_{Qi}$×M). Here, $\tau_{Qi}$ represents the time required to perform the Qi standard judgment operation once (S212, S214, S216). In particular, the Q value measurement operation S212 requires a long period of time.

In contrast, with the operations shown in the flowchart in FIG. 2, this allows the operation to transit to the PMA standard final judgment operation S130 after the time period required to perform the Qi standard tentative judgment operation once (S112, S114). Such an arrangement requires the Qi standard tentative judgment to be made only once. Furthermore, the Qi standard tentative judgment operation does not include the Q value judgment. Accordingly, the Qi standard tentative judgment operation requires only a very short period of time.

As described above, with the operations shown in the flowchart in FIG. 2, this allows the judgment time to be reduced in a case in which the power receiving apparatus RX conforms to the second method (PMA standard).

[Second Advantage]

With the control method shown in FIG. 2, in the power receiving apparatus RX detection operation S100, only an analog ping is employed. Such an analog ping requires little transmission electric power as compared with a digital ping. This is advantageous from the viewpoint of power saving. Also, in a case in which the controller 206 is implemented in the form of a combination of a microcomputer 210 and a logic circuit 610, in the analog ping sending stage, the microcomputer 210 is able to remain in the sleep state. This allows the power consumption of the power transmission apparatus TX to be reduced.

Second Embodiment

Figure 5:
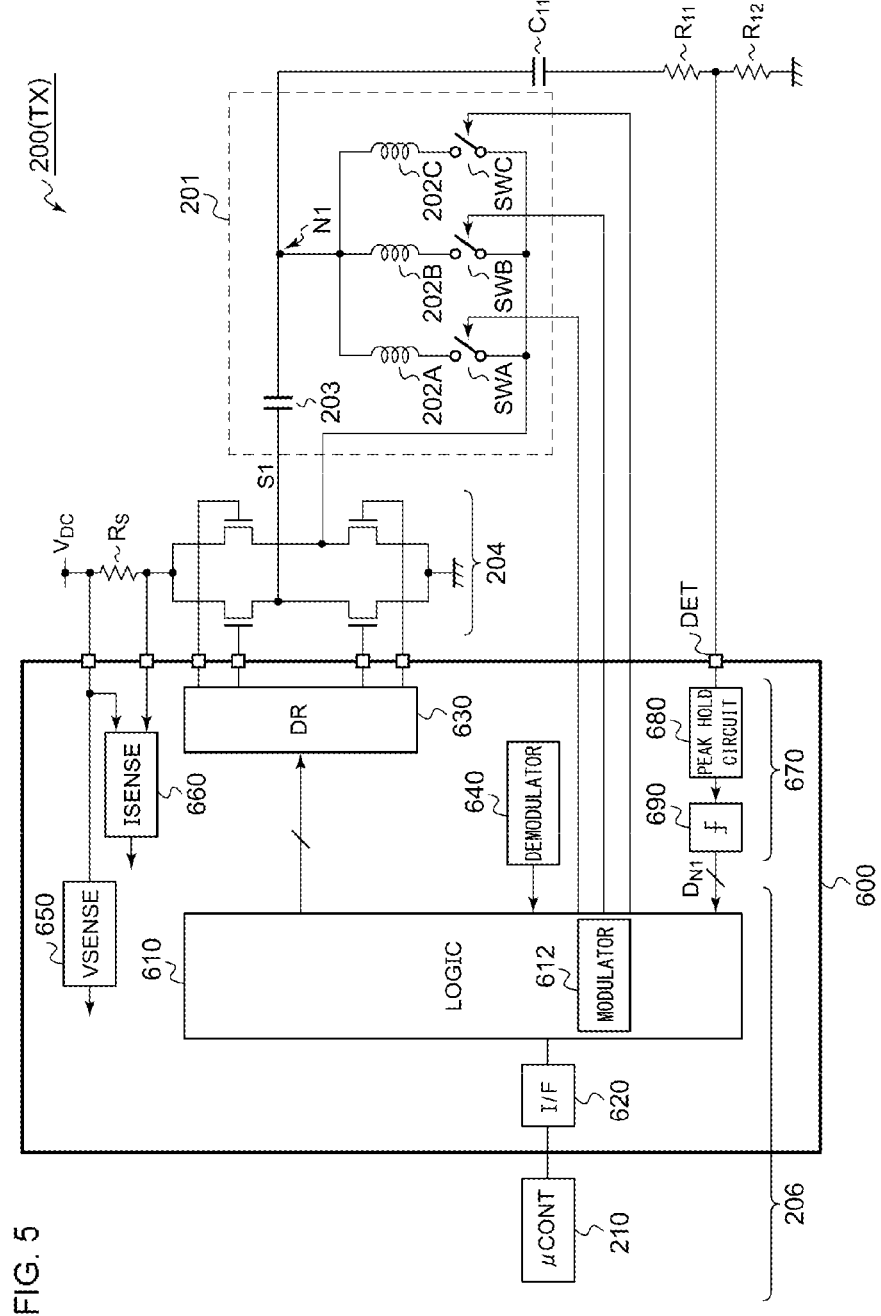
FIG. 5 is a block diagram showing a power transmission apparatus according to a second embodiment.

FIG. 5 is a block diagram showing a power transmission apparatus 200 according to a second embodiment. The power transmission apparatus 200 includes a transmission antenna 201, an inverter 204, a transmission control IC (Integrated Circuit) 600, and a microcomputer 210.

The transmission antenna 201 of the power transmission apparatus 200 includes multiple (in this example, three) transmission coils 202A through 202C and multiple switches SWA through SWC. The multiple transmission coils 202A through 202C are arranged on a charging stand with respective position offsets in the horizontal direction. The number of the transmission coils is not restricted in particular. The power transmission apparatus 200 selects one from among the transmission coils that exhibits the strongest coupling with the power receiving apparatus RX. Subsequently, the power transmission apparatus 200 performs the power supply operation. Specifically, the power transmission apparatus 200 turns on one of the multiple switches SWA through SWC that corresponds to the transmission coil 202 thus selected, and turns off the remaining switches.

The inverter 204 is configured as a full-bridge circuit, and applies an AC driving signal 51 to the transmission antenna 201. A sensing resistor $R_S$ is provided to the input stage of the inverter 204.

The microcomputer 210 executes a program loaded from ROM, so as to execute various kinds of operations defined for the Qi standard and the PMA standard.

The transmission control IC 600 includes a logic circuit 610, an interface circuit 620, a driver 630, a demodulator 640, a voltage detection circuit 650, a current detection circuit 660, a signal level detection circuit 670, and the like, which are monolithically integrated on a single semiconductor substrate.

The logic circuit 610 and the microcomputer 210 are coupled via a bus and the interface circuit 620, which allows information to be transmitted and received between them. The interface between the logic circuit 610 and the microcomputer 210 may be configured as an $I^2C$ (Inter-Integrated Circuit) interface or an SPI (Serial Peripheral Interface). However, the present invention is not restricted to such an arrangement. The microcomputer 210 and the logic circuit 610 of the transmission control IC 600 correspond to the controller 206 shown in FIG. 1. The controller 206 controls the overall operation of the power transmission apparatus 200 according to the flowchart shown in FIG. 2, and identifies the power receiving apparatus RX. Furthermore, after the start of the power supply operation (power transfer phase), the controller 206 controls the electric power to be transmitted, based on a signal received from the power receiving apparatus RX. The control operations employed to control the electric power to be transmitted include: (i) switching of the operation mode of the inverter 204 (full-bridge mode/half-bridge mode); (ii) controlling the switching frequency of the inverter 204; (iii) controlling the phase applied to the inverter 204; (iv) controlling the duty ratio applied to the inverter 204; and (v) controlling the voltage $V_{DC}$ supplied to the inverter 204.

It should be noted that, in a case in which the controller 206 is configured as a combination of the microcomputer 210 and the logic circuit 610, the assignment of the operations to the software control operation by means of the microcomputer 210 and the hardware control operation by means of the logic circuit 610 is no more than a matter of design choice.

The driver 630 drives the inverter 204 according to a control instruction received from the logic circuit 610. It should be noted that a bootstrap circuit is coupled to the driver 630, which is not shown in FIG. 5.

The logic circuit 610 includes an FM modulator 612, and modulates the switching frequency of the inverter 204 according to a signal (packet) to be transmitted from the power transmission apparatus TX to the power receiving apparatus RX.

The demodulator 640 demodulates a received signal that has been AM modulated by the power receiving apparatus RX, based on the electrical state of the transmission antenna 201. The received signal includes a CE packet and an SS packet that conform to the Qi standard, or otherwise a DEC signal, an INC signal, and a NoCh signal that conform to the PMA standard, etc. The configuration of the demodulator 640 is not restricted in particular.

The voltage detection circuit 650 detects the input voltage $V_{DC}$ of the inverter 204. Furthermore, the current detection circuit 660 detects a current that flows through the inverter 204, based on a voltage drop that occurs across the sensing resistor $R_S$. The detection values of the voltage and the current are input to the logic circuit 610. The logic circuit 610 or otherwise the microcomputer 210 calculates the electric power transmitted from the power transmission apparatus 200, based on the values of the voltage and the current. The electric power thus calculated may be used for the FOD operation using a power-loss method.

The detection value of the input voltage $V_{DC}$ is also used for the power transmission control operation according to the input voltage $V_{DC}$ of the inverter 204. In addition, the detected values of the voltage and current may be used for the overvoltage protection (OVP), overcurrent protection (OCP), etc.

Next, description will be made regarding the selection from among the multiple transmission coils 202.

Figure 6:
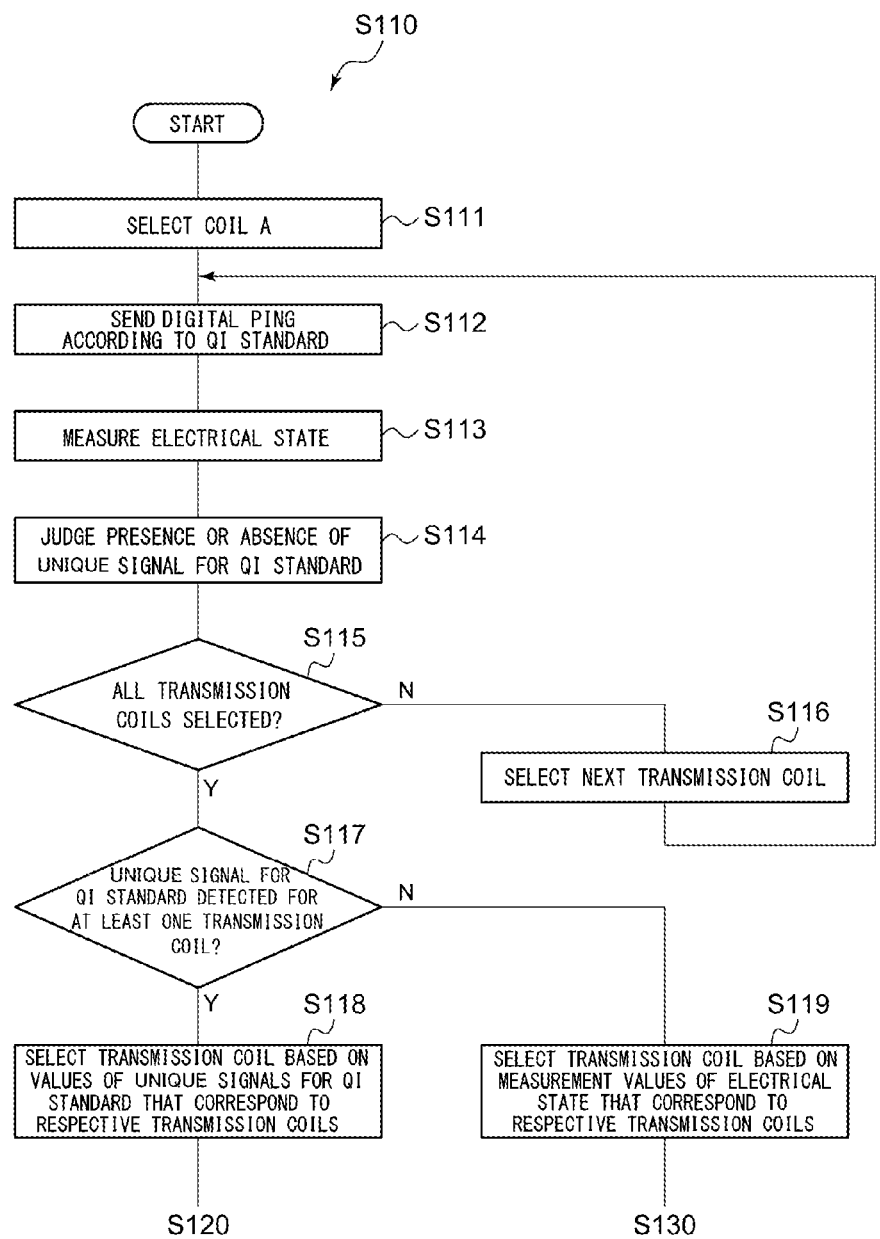
FIG. 6 is a flowchart showing a part of a control method according to the second embodiment.

FIG. 6 is a flowchart showing a part of the control method according to the second embodiment. FIG. 6 shows the operations relating to the tentative judgment operation S110 shown in FIG. 2. The power transmission apparatus 200 selects one transmission coil 202A from among the multiple transmission coils 202A through 202C (S111), and sends a digital ping according to the Qi standard (S112). Furthermore, the power transmission apparatus 200 measures the electrical state of the transmission coil 202A (S113), and judges whether or not an unique signal (SS packet) defined for the Qi standard has been received (S114). When all the transmission coils have not been selected (NO in S115), the next transmission coil (202B, 202C, . . . ) is selected (S116).

Returning to FIG. 5, description will be made. The electrical state to be measured in Step S113 preferably indicates the degree of coupling between the transmission coil thus selected and the reception coil. From this viewpoint, the voltage $V_{N1}$ that occurs at a connection node N1 that connects the resonance capacitor 203 and the multiple transmission coils 202 shown in FIG. 5 is preferably measured. Specifically, the voltage $V_{N1}$ at the connection node N1 (coil-end voltage) is divided by means of resistors $R_{11}$ and $R_{12}$, and the voltage thus divided is input to a voltage detection pin DET of the transmission control IC 600. An AC coupling capacitor $C_{11}$ may be provided between the resistor $R_{11}$ and the connection node N1.

The coil-end voltage $V_{N1}$ is an AC voltage. The controller 206 measures the amplitude of the coil-end voltage $V_{N1}$. The signal level detection circuit 670 detects the coil-end voltage $V_{N1}$ that occurs in a state in which one of the multiple transmission coils 202A through 202C is selected. The controller 206 determines one transmission coil to be used for power supply, based on the results of comparison of the measurement values of the coil-end voltage $V_{N1}$ acquired for the multiple transmission coils.

The signal level detection circuit 670 includes a peak hold circuit 680 and a quantization circuit 690, for example. The peak hold circuit 680 holds the peak of the voltage at the voltage detection pin DET. The peak value thus held represents the amplitude of the coil-end voltage $V_{N1}$. The quantization circuit 690 quantizes the output of the peak hold circuit 680. The data $D_{N1}$ thus quantized is input to the logic circuit 610. The quantization circuit 690 may be configured as an A/D converter or otherwise a level judgment circuit having a simple configuration.

The logic circuit 610 receives the data $D_{N1}$ acquired for each state in which the corresponding transmission coil 202 is selected, and holds the data $D_{N1}$. Returning to FIG. 6 again, description will be made.

When the measurement of the electrical state (coil-end voltage) has been completed for all the transmission coils in such a selected state (YES in S115), the flow transits to the judgment operation for determining the coil to be used.

As a result of the digital ping according to the Qi standard (S112), when an unique signal (SS packet) defined for the Qi standard has been received from at least one transmission coil (YES in S117), the transmission coil 202 to be used in the subsequent operations (S120 in FIG. 2) is determined based on the results of comparison of the unique signals (S118). Specifically, such an arrangement may determine to use the transmission coil 202 that corresponds to the SS packet having the largest value or otherwise having a value in a suitable range.

As a result of the digital ping according to the Qi standard (S112), when an unique signal (SS packet) defined for the Qi standard has not been received from any one of the transmission coils 202 (NO in S117), the transmission coil 202 to be used in the subsequent operations (S120 in FIG. 2) is determined based on the comparison of the electrical states measured for the respective transmission coils 202 in Step S113 (S119).

FIGS. 7A and 7B each show an example of the time chart of the start-up operation of the power transmission apparatus TX according to the flowchart shown in FIG. 6.

FIG. 7A shows a case in which the power receiving apparatus RX is designed assuming a power supply sequence that conforms to the Qi standard. In the power receiving apparatus RX detection operation S100, the power transmission apparatus TX sends an analog ping while switching the transmission coil to be used between the multiple transmission coils A through C. When the power receiving apparatus RX is detected at the time point ti as a result of an analog ping via one transmission coil (in this example, transmission coil B), the flow transits to the sequence S110 for the tentative judgment operation and the coil selection operation.

The power transmission apparatus TX sends a digital ping while switching the multiple transmission coils A through C. In this operation, the coil-end voltage $V_A$ is measured in a state in which the transmission coil A is selected. Furthermore, the coil-end voltage $V_B$ is measured in a state in which the transmission coil B is selected, and the coil-end voltage $V_C$ is measured in a state in which the transmission coil C is selected. In a case in which the power transmission apparatus TX receives an SS packet in the measurement of the coil-end voltage $V_C$, this leads to modulation effects on the coil-end voltage measurement. Accordingly, the coil-end voltage $V_C$ is preferably measured at a timing at which the power transmission apparatus TX has no potential to receive an SS packet after the voltage waveform that corresponds to the digital ping is stabilized. The Qi standard defines the SS packet transmission timing. This allows the coil-end voltage measurement timing to be designed to avoid the packet receiving timing. In this example, the power receiving apparatus RX does not return a response to a digital ping transmitted from the transmission coil A. However, the power receiving apparatus RX returns a response to each of the digital pings transmitted from the transmission coils B and C. Specifically, the power receiving apparatus RX returns SS packets $S_{SB}$ and $S_{SC}$. The power transmission apparatus TX makes a comparison between the SS packets $S_{SB}$ and $S_{SC}$. In this example, the relation $S_{SB} < S_{SC}$ holds true. Accordingly, the transmission coil C is selected as a coil to be used. Subsequently, in the Qi standard final judgment operation S120, the Q value is measured and a digital ping is sent using the transmission coil C. As a result of receiving an SS packet, final judgment is made that the power receiving apparatus RX supports the Qi standard.

FIG. 7B shows a case in which the power receiving apparatus RX is designed assuming a power supply sequence that conforms to the PMA standard. The power transmission apparatus TX sends an analog ping while switching the multiple transmission coils A through C. When the power receiving apparatus RX is detected at the time point ti as a result of an analog ping via the transmission coil B, the flow transits to the sequence S110 for the tentative judgment operation and the coil selection operation.

The power transmission apparatus TX sends a digital ping while switching the transmission coil to be used between the multiple transmission coils A through C. Subsequently, the coil-end voltages $V_A$ through $V_C$ are each measured in a state in which the corresponding transmission coil is selected from the transmission coils A through C. The power receiving apparatus RX that conforms to the PMA standard does not return a response to a digital ping of the Qi standard. Accordingly, the power transmission apparatus TX does not receive an SS packet. In this case, the coil to be used is determined based on the results of measurement of the coil-end voltages $V_A$ through $V_C$ measured for the respective transmission coils. In this example, the coil-end voltage $V_B$ measured in a state with selection of the transmission coil B has the smallest value. Thus, the transmission coil B is determined as the coil to be used.

Subsequently, in the PMA standard final judgment operation S130, an analog ping operation and a digital ping operation are executed via the transmission coil B according to the PMA standard. As a result of receiving a DEC signal, final judgment is made that the power receiving apparatus RX supports the PMA standard.

The above are the operations of the power transmission apparatus TX and the power receiving apparatus RX according to the second embodiment.

With the control operations shown in FIG. 6, such an arrangement does not require the transmission coil switching operation after the tentative judgment operation S110. This allows the time required for the start-up operation and the time required for judgment of the power receiving apparatus RX to be reduced.

Furthermore, even in a case in which the power receiving apparatus RX conforms to the second method (PMA standard), such an arrangement is capable of selecting an optimum transmission coil by performing a digital ping operation of the first method (Qi standard) without a need to perform a digital ping operation of the second method. This allows the optimum transmission coil to be determined in a short period of time.

Moreover, in the second method, such as the PMA standard, in which a signal having a correlation with the degree of coupling between the transmission coil and the reception coil is not transmitted in the digital ping phase, the degree of coupling is estimated based on the electrical state of the transmission coil (transmission antenna). This allows the suitable coil to be selected.

Description has been made above regarding the present invention with reference to the embodiments. The above-described embodiments have been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

[First Modification]

Description has been made in the first and second embodiments regarding an arrangement that performs the power receiving apparatus RX detection operation S200 using only an analog ping operation. However, the present invention is not restricted to such an arrangement. In a case in which the detection of the power receiving apparatus RX using an analog ping provides only a low detection precision, both the analog ping operation and the digital ping operation may be used to detect the power receiving apparatus RX.

[Second Modification]

Description has been made in the second embodiment regarding an arrangement in which, in a case in which the power receiving apparatus RX supports the Qi standard, the coil to be used is determined from among the multiple transmission coils based on the SS packets. Also, the coil-end voltages $V_{N1}$ may be used to determine the coil to be used, instead of or in addition to using the SS packets.

[Third Modification]

Specific operations of the final judgement operation S120 for the first method and the final judgment operation S130 for the second method may be modified as long as consistency is maintained with each method (standard).

For example, when the Qi standard final judgment operation S120 is repeated multiple times in the mode shuffle operation S140, the Q value measurement (S122) may be omitted in the second and subsequent executions of the final judgment operation S120. In this case, in the flowchart shown in FIG. 2, the final judgment operation S120 is repeatedly performed via the path P1 indicated by the line of alternately long and short dashes. The Q value measurement requires a long period of time. Accordingly, by omitting such a redundant measurement operation, this allows the start-up time to be reduced.

Also, in the final judgment operation S120, an analog ping of the Qi standard may be sent as an additional ping before sending a digital ping of the Qi standard. If the power receiving apparatus RX is removed after transition to the final judgment operation S120, a digital ping is repeatedly sent although there is no power receiving apparatus RX. This is a meaningless operation. In order to solve such a problem, an analog ping is sent before sending a digital ping, so as to confirm the presence of the power receiving apparatus RX every time a digital ping is sent. In a case in which there is no power receiving apparatus RX, sending the digital ping and the subsequent operations may be skipped. This allows the power consumption to be reduced.

[Fourth Modification]

Description has been made in the embodiment regarding a wireless power transmission apparatus that supports the Qi standard and the PMA standard. However, the present invention is not restricted to such an arrangement. Also, the present invention is applicable to wireless power transmission apparatuses that support other specifications similar to the Qi standard and the PMA standard, or otherwise to wireless power transmission apparatuses that support specifications that will be developed in the future.

While the preferred embodiments of the present invention have been described using specific terms, such description is for illustrative purposes only, and it is to be understood that changes and variations may be made without departing from the spirit or scope of the appended claims.

What is claimed is:

1. A control method for a wireless power transmission apparatus structured to be capable of supplying electric power to a wireless power receiving apparatus that supports at least a first method or otherwise a second method, the control method comprising:
    a step A in which the wireless power receiving apparatus is detected;
    a step B in which, when the wireless power receiving apparatus has been detected, a pre digital ping is sent according to the first method, and when the wireless power transmission apparatus has received an unique signal defined for the first method from the wireless power receiving apparatus as a result of the pre digital ping of the first method, tentative judgment is made that the wireless power receiving apparatus supports the first method, and when the wireless power transmission apparatus has not received such an unique signal, tentative judgment is made that the wireless power receiving apparatus supports the second method;
    a step C in which a post digital ping is sent according to the first method, final judgment is made regarding whether or not the wireless power receiving apparatus supports the first method when tentative judgment has been made that the wireless power receiving apparatus supports the first method, and final judgment is made that the wireless power receiving apparatus supports the first method upon reception of an unique signal defined for the first method from the wireless power receiving apparatus as a result the post digital ping of the first method; and
    a step D in which, when tentative judgment has been made that the wireless power receiving apparatus supports the second method, final judgment is made regarding whether or not the wireless power receiving apparatus supports the second method.

2. The control method according to claim 1, wherein, in the step D, an analog ping and a digital ping are sent according to the second method,
    and wherein, upon reception of an unique signal defined for the second method from the wireless power receiving apparatus as a result of the digital ping of the second method, final judgment is made that the wireless power receiving apparatus supports the second method.

3. The control method according to claim 1, wherein, when neither final judgment that the wireless power receiving apparatus supports the first method nor final judgment that the wireless power receiving apparatus supports the second method has been made, the steps C and D are repeated in a predetermined sequence.

4. The control method according to claim 3, wherein the sequence differs from an alternating sequence in which the steps C and D are alternately repeated.

5. The control method according to claim 3, wherein the ratio between a number of times the step C is performed and a number of times the step D is performed corresponds to a magnitude relation between a number of wireless power receiving apparatuses that support the first method and a number of wireless power receiving apparatuses that support the second method.

6. The control method according to claim 1, wherein the wireless power transmission apparatus comprises a plurality of transmission coils,
    wherein, in the step B, a sequence comprising sending a digital ping of the first method, acquiring an electrical state of the selected transmission coil, and judging whether or not an unique signal defined for the first method has been received is repeatedly executed while sequentially selecting one from among the plurality of transmission coils,
    and wherein, when an unique signal defined for the first method has been received as a result of the digital ping of the first method, the transmission coil to be used in the subsequent operations is determined based on results of comparison of the unique signals received for the respective transmission coils.

7. The control method according to claim 6, wherein, when the unique signal defined for the first method has not been received as a result of the digital ping of the first method, the transmission coil to be used in the subsequent operations is determined based on results of comparison of the electrical states acquired for the plurality of respective transmission coils.

8. The control method according to claim 7, wherein the electrical state is a voltage at a connection node that couples the transmission coils and a series resonance capacitor.

9. The control method according to claim 1, wherein the first method corresponds to the Qi standard, and the second method corresponds to the PMA standard.

10. The control method according to claim 9, wherein, in the step C, a Q value of the transmission antenna is measured before sending a post digital ping of the first method.

11. The control method according to claim 10, wherein, in a case in which the step C is repeated a plurality of times, the Q value measurement is omitted in a second and subsequent executions of the step C.

12. A wireless power transmission apparatus structured to be capable of supplying electric power to a wireless power receiving apparatus that supports at least a first method or otherwise a second method, the wireless power transmission apparatus comprising:
- a transmission antenna;
- an inverter arranged such that an output side thereof is coupled to the transmission antenna; and
- a controller structured to control the inverter,
- wherein the controller is structured to execute:
  - a step A in which the wireless power receiving apparatus is detected;
  - a step B in which, when the wireless power receiving apparatus has been detected, a pre digital ping is sent according to the first method, and when the wireless power transmission apparatus has received an unique signal defined for the first method from the wireless power receiving apparatus as a result of the pre digital ping of the first method, tentative judgment is made that the wireless power receiving apparatus supports the first method, and when the wireless power transmission apparatus has not received such an unique signal, tentative judgment is made that the wireless power receiving apparatus supports the second method;
  - a step C in which a post digital ping is sent according to the first method, final judgment is made regarding whether or not the wireless power receiving apparatus supports the first method when tentative judgment has been made that the wireless power receiving apparatus supports the first method, and final judgment is made that the wireless power receiving apparatus supports the first method upon reception of an unique signal defined for the first method from the wireless power receiving apparatus as a result of the post digital ping of the first method; and
  - a step D in which, when tentative judgment has been made that the wireless power receiving apparatus supports the second method, final judgment is made regarding whether or not the wireless power receiving apparatus supports the second method.

13. The wireless power transmission apparatus according to claim 12, wherein the controller is structured such that, in the step D, an analog ping and a digital ping are sent according to the second method, and upon reception of an unique signal defined for the second method from the wireless power receiving apparatus as a result of the digital ping of the second method, final judgment is made that the wireless power receiving apparatus supports the second method.

14. The wireless power transmission apparatus according to claim 12, structured such that, when neither final judgment that the wireless power receiving apparatus supports the first method nor final judgment that the wireless power receiving apparatus supports the second method has been made, the steps C and D are repeated in a predetermined sequence.

15. The wireless power transmission apparatus according to claim 14, structured such that the sequence differs from an alternating sequence in which the steps C and D are alternately repeated.

16. The wireless power transmission apparatus according to claim 14, structured such that the ratio between a number of times the step C is performed and a number of times the step D is performed corresponds to a magnitude relation between a number of wireless power receiving apparatuses that support the first method and a number of wireless power receiving apparatuses that support the second method.

17. The wireless power transmission apparatus according to claim 12, wherein the transmission antenna comprises a plurality of transmission coils,
- wherein the controller is structured to execute a sequence comprising sending a digital ping of the first method, acquiring an electrical state that occurs at the selected transmission coil, and judging whether or not an unique signal defined for the first method has been received while sequentially selecting one from among the plurality of transmission coils,
- and wherein, when an unique signal defined for the first method has been received as a result of the digital ping of the first method, the transmission coil to be used in the subsequent operations is determined based on results of comparison of the unique signals received for the respective transmission coils.

18. The wireless power transmission apparatus according to claim 17, structured such that, when the unique signal defined for the first method has not been received as a result of the digital ping of the first method, the transmission coil to be used in the subsequent operations is determined based on results of comparison of the electrical states acquired for the plurality of respective transmission coils.

19. The wireless power transmission apparatus according to claim 18, structured such that the electrical state is a voltage at a connection node that couples the transmission coils and a series resonance capacitor.

20. The wireless power transmission apparatus according to claim 12, structured such that the first method corresponds to the Qi standard, and the second method corresponds to the PMA standard.

21. The wireless power transmission apparatus according to claim 20, structured such that, in the step C, a Q value of the transmission antenna is measured before sending a post digital ping of the first method.

22. The wireless power transmission apparatus according to claim 21, structured such that, in a case in which the step C is repeated a plurality of times, the Q value measurement is omitted in a second and subsequent executions of the step C.

* * * * *